(12) United States Patent
Nakamachi et al.

(10) Patent No.: US 6,355,319 B1
(45) Date of Patent: Mar. 12, 2002

(54) POLYESTER RESIN COMPOSITION AND HOLLOW MOLDED CONTAINER MADE THEREFROM

(75) Inventors: Koji Nakamachi; Hiroji Niimi; Mitsuaki Masumoto, all of Waki-cho (JP)

(73) Assignee: Mitsui Chemicals INC, Tokyo (JP)

( * ) Notice: Subject to any disclaimer, the term of this patent is extended or adjusted under 35 U.S.C. 154(b) by 0 days.

(21) Appl. No.: 09/555,042

(22) PCT Filed: Sep. 10, 1999

(86) PCT No.: PCT/JP99/04937

§ 371 Date: May 24, 2000

§ 102(e) Date: May 24, 2000

(87) PCT Pub. No.: WO00/18842

PCT Pub. Date: Apr. 6, 2000

(30) Foreign Application Priority Data

Sep. 30, 1998 (JP) ............................................ 10-278624
Aug. 6, 1999 (JP) ............................................ 11-223893

(51) Int. Cl.⁷ .............................................. C08L 67/02
(52) U.S. Cl. .................. 428/35.7; 428/36.92; 525/166; 525/173; 525/176
(58) Field of Search ................................ 525/166, 173, 525/176; 428/35.7, 36.92

(56) References Cited

U.S. PATENT DOCUMENTS 4,463,121 A    7/1984    Gartland et al.

FOREIGN PATENT DOCUMENTS

| JP | 5902478 | 3/1984 |
|---|---|---|
| JP | 4372648 | 12/1992 |
| JP | 08302168 | 11/1996 |
| JP | 09151308 | 6/1997 |
| JP | 09194697 | 7/1997 |

*Primary Examiner*—Patricia A. Short

(57) ABSTRACT

The present invention provides a polyester resin composition comprising (A) a polyethylene terephthalate composed mainly of repeating units derived from a dicarboxylic acid containing terephthalate acid and/or an esterified derivative thereof and a diol containing ethylene glycol and/or esterified derivative thereof, and (B) an ethylene/(meth) acrylic acid copolymer and, optionally, (C) polyethylene. The polyethylene terephthalate contains diethylene glycol units in a ratio of 0.5 to 2.0% by weight and a cyclic trimer in an amount not greater than 0.5% by weight based on polyethylene terephthalate. The ethylene/ (meth) arcylic acid copolymer is in an amount of 0.1 to 10,000 ppb based on the composition. Also provided are a perform formed from the composition and a blow molded container produced therefrom.

10 Claims, No Drawings

POLYESTER RESIN COMPOSITION AND HOLLOW MOLDED CONTAINER MADE THEREFROM

CROSS-REFERENCE TO RELATED APPLICATION

This application is the National Phase entry, under 35 USC §371, of international application PCT/JP99/04937, filed Sep. 10, 1999, and designating the United States.

TECHNICAL FIELD

The present invention relates to a polyester resin composition and a blow molded container therefrom. More particularly, the present invention relates to a polyester resin composition from which a transparent heat-resistant blow molded container suitable for use to pack potables and other liquids can be molded with high productivity, and relates to a preform formed from the polyester resin composition and a blow molded container obtained by drawing the preform.

BACKGROUND ART

In recent years, various plastic materials are used as a raw material of containers for packing carbonated beverage, juice, natural water, alcohol, various drinking teas, edible oil, liquid flavoring and other liquids. Among them, polyesters such as polyethylene terephthalate (PET) are very often utilized as a raw material of blow molded containers for potables because of the excellence in transparency at molding, gas barrier properties, heat resistance and mechanical strength.

These blow molded containers are often packed with potable having undergone heating sterilization and being still in the hot state. The blow molded containers must have satisfactory heat resistance in order to be free from problems such that the blow molded containers are clouded or caused to suffer from deformation such as shrinking or swelling by hot charged material and such that the self-supporting properties of the blow molded containers are deteriorated by the deformation.

Further, it is strongly demanded that the plastics employed to form the blow molded containers for potables be concurrently transparent.

Still further, in the production of blow molded containers, materials suitable for high-productivity production are demanded, and high-speed production thereof is desired. For realizing high-speed production of blow molded containers, it is desirable to employ a material whose heating crystallization rate is high with a range ensuring smooth molding operation. Thus, a polyester resin exhibiting a high crystallization rate is demanded.

However, when the crystallization rate is extremely high, the width of suitable molding conditions is restricted with the result that the yield at molding production is lowered. Accordingly, it is desirable that the material for producing the above blow molded containers have an appropriate crystallization rate, taking both the molding efficiency and the molding conditions into account. In order to meet this requirement, the polyester is loaded with various compounding agents so that the properties of the molding thereof are regulated.

For example, a polyester resin composition comprising polyethylene terephthalate in which a polyolefin such as polypropylene was contained in an amount of 0.002 to 200 ppm was proposed in Japanese Patent Laid-open Publication No. 8(1996)-302168.

In addition, a polyester resin composition comprising a polyester resin loaded with polypropylene in a content of 0.1 ppb to 1000 ppm was proposed in Japanese Patent Laid-Open Publication No. 9(1997)-194697.

Further, a polyester resin composition comprising a polyester resin composed mainly of ethylene terephthalate units in which polyethylene was contained in an amount of 0.1 to 45 ppb was proposed in Japanese Patent Laid-open Publication No. 9(1997)-151308.

Both the above compositions exhibit accelerated crystallization and maintain transparency still fit for use as compared with those not loaded with compounding agents. However, there is the problem that the transparency thereof is inferior to that of the molding of polyethylene terephthalate only.

When it is intended to increase the crystallization rate without any substantial lowering of transparency, it has been requisite to control the amount of added compounding agent within a range of extremely minute quantity.

The object of the present invention is to provide a polyester resin composition from which, in the molding of blow molded containers, highly heat-resistant transparent blow molded containers can be obtained with high productivity and thus to provide blow molded containers formed therefrom. In particular, the object of the present invention is to provide a polyester resin composition from which blow molded containers of excellent transparency can be obtained and thus to provide blow molded containers formed therefrom.

DISCLOSURE OF THE INVENTION

The polyester resin composition of the present invention comprises:

(A) a polyethylene terephthalate composed mainly of repeating units derived from a dicarboxylic acid containing terephthalic acid and/or an esterified derivative thereof and a diol containing ethylene glycol and/or an esterified derivative thereof, said polyethylene terephthalate containing diethylene glycol units in a ratio of 0.5 to 2.0% by weight based on the polyethylene terephthalate, and (B) an ethylene/(meth)acrylic acid copolymer, said ethylene/(meth)acrylic acid copolymer (B) contained in the composition in an amount of 0.1 to 10,000 ppb based on the composition.

The content of a cyclic trimer in the polyethylene terephthalate is preferably not greater than 0.5% by weight based on the polyethylene terephthalate.

In this polyester resin composition, it is preferred that the ethylene/(meth)acrylic acid copolymer (B) have a (meth)acrylic acid content of 0.5 to 8% by weight. This polyester resin composition may further contain (C) polyethylene. In the polyethylene containing composition, it is preferred that the ethylene/(meth)acrylic acid copolymer (B) and the polyethylene (C) be contained in the composition in a total amount of 0.1 to 10,000 ppb based on the composition, and that the (meth)acrylic acid content based on the total weight of ethylene/(meth)acrylic acid copolymer (B) and polyethylene (C) range from 0.5 to 8% by weight.

Preforms can be produced from the polyester resin composition of the present invention. Blow molded containers having excellent heat resistance and transparency can be obtained with high productivity by drawing the preforms. Especially, blow molded containers of striking transparency can be obtained with high efficiency.

BEST MODE FOR CARRYING OUT THE INVENTION

The polyester resin composition of the present invention and the blow molded containers formed therefrom will be described in detail below.

<Polyester resin composition>

The polyester resin composition of the present invention comprises a polyethylene terephthalate (A) and an ethylene/(meth)acrylic acid copolymer (B). This polyester resin composition may further contain polyethylene (C).

These components will first be described.

Polyethylene terephthalate (A)

The polyethylene terephthalate (A) for use in the present invention is produced from, as main raw materials, dicarboxylic acids such as terephthalic acid and esterified derivatives thereof (for example, lower alkyl esters and phenyl esters) and diols such as ethylene glycol and ester derivatives thereof (for example, monocarboxylic acid esterified ethylene oxide).

The ratio of diethylene glycol (DEG) units contained in the above polyethylene terephthalate is generally in the range of 0.5 to 2.0% by weight, preferably 0.8 to 1.6% by weight, based on the polyethylene terephthalate.

When the DEG ratio is 0.5% by weight or higher, the transparency of the column part of a molded bottle is excellent. Further, when the DEG ratio is 2.0% by weight or below, excellent heat resistance and crystallization accelerating effect are realized.

As means for regulating the DEG ratio so as to fall within the above range, there can be mentioned the method in which diethylene glycol is used as a starting material of polymerization and the method in which, since diethylene glycol is formed as a by-product from ethylene glycol as a main starting material, the amount of by-product is regulated by appropriately selecting reaction conditions and additives.

Examples of additives capable of inhibiting the formation of DEG include basic compounds, for example, tertiary amines such as triethylamine, quarternary ammonium salts such as tetraethylammonium hydroxide and alkali metal compounds such as sodium carbonate.

Examples of the compounds capable of accelerating the formation of DEG include inorganic acids such as sulfuric acid and organic acids such as benzoic acid.

The polyethylene terephthalate (A), as the needs arise, may contain units derived from other dicarboxylic acids and/or diols in an amount of not greater than 20 mol %. Examples of such dicarboxylic acids other than terephthalic acid include phthalic acid, isophthalic acid, naphthalenedicarboxylic acid, diphenyldicarboxylic acid and diphenoxyethanedicarboxylic acid. These can be used in the form of ester derivatives thereof.

Examples of diols other than ethylene glycol include aliphatic diols such as triethylene glycol, tetraethylene glycol, trimethylene glycol (propylene glycol), butanediol, pentanediol, neopentyl glycol, hexamethylene glycol, dodecamethylene glycol and polyethylene glycol; and aromatic diols such as bisphenols and hydroquinone. These can be used in the form of ester derivatives thereof.

The above compounds may be used in combination.

The polyethylene terephthalate (A) for use in the present invention, according to necessity, may contain a small amount, e.g. 2 mol % or less based on the dicarboxylic acid component (100 mol %), of units derived from a polyfunctional compound such as trimesic acid, pyromellitic acid, trimethylolethane, trimethylolpropane, trimethylolmethane or pentaerythritol.

The intrinsic viscosity (IV, measured at 25° C. in a solvent of a mixture of phenol and 1,1,2,2-tetrachloroethane) of the above polyethylene terephthalate (A) for use in the present invention is generally in the range of 0.3 to 2.0 dl/g, preferably 0.5 to 1.5 dl/g, and still preferably 0.7 to 1.2 dl/g. The melting point thereof is generally in the range of 210 to 265° C., preferably 220 to 260° C. The glass transition temperature thereof is generally in the range of 50 to 120° C., preferably 60 to 100° C.

The content of cyclic trimer, specifically cyclic trimer of oxyethyleneoxyterephthaloyl unit, in the polyethylene terephthalate (A) for use in the present invention is preferably up to 0.5% by weight, still preferably up to 0.4% by weight.

The use of polyethylene terephthalate whose cyclic trimer content is up to 0.5% by weight is preferred from the viewpoint that, at the molding of the resin composition, both the possibility of staining of the metal mold, etc. and the possibility of clouding of the column part of the molded item can be reduced. The content of cyclic trimer in the polyethylene terephthalate (A) can be lowered by, for example, raising the solid-phase polymerization temperature and prolonging the polymerization time.

The polyethylene terephthalate (A) for use in the present invention can be produced from the above dicarboxylic acid and diol by the conventional method. In the present invention, although the "raw polyethylene terephthalate" commercially available generally in the form of pellets is used as the above polyethylene terephthalate (A), optionally use may be made of "reproduced polyethylene terephthalate" (recycled polyethylene terephthalate) in combination with the raw polyethylene terephthalate. For example, the "reproduced polyethylene terephthalate" may be contained in the polyethylene terephthalate (A) in a ratio of 1 to 50% by weight.

The terminology "raw polyethylene terephthalate" used in this specification means polyethylene terephthalate free from heat history, produced in the form of pellets from a dicarboxylic acid and a diol and passed in the heated and molten state through a molding machine so as to obtain blow molded containers or preforms. On the other hand, the terminology "reproduced polyethylene terephthalate" means polyethylene terephthalate with heat history (recycled polyethylene terephthalate), obtained by passing the raw polyethylene terephthalate in the heated and molten state through a molding machine at least once and heating the resultant polyethylene terephthalate followed by pelletization. The operation of "passing in the heated and molten state through a molding machine" for the raw polyethylene terephthalate comprises melting pellets (chips) of the raw polyethylene terephthalate by heating the same and forming the melt into a desired shape such as that of preform or blow molded container.

Ethylene/(meth)acrylic Acid Copolymer (B)

The ethylene/(meth)acrylic acid copolymer (B) for use in the present invention is, for example, an ethylene/methacrylic acid copolymer, an ethylene/acrylic acid copolymer or an ethylene/acrylic acid/methacrylic acid terpolymer.

The ethylene/(meth)acrylic acid copolymer (B) for use in the present invention may include some thereof which contain a small amount of components other than ethylene and (meth)acrylic acid in the copolymerization thereof. Examples of such other components include unsaturated carboxylic acid esters such as methyl (meth)acrylate, ethyl (meth)acrylate and isobutyl (meth)acrylate; and vinyl esters such as vinyl acetate.

It is preferred that the content of (meth)acrylic acid in the ethylene/(meth)acrylic acid copolymer (B) be in the range of 0.5 to 8% by weight, especially 1 to 6% by weight.

Regulating the (meth)acrylic acid content so as to fall within this range is preferred from the viewpoint that the heat-up crystallization rate can be increased while maintaining the transparency of the polyester resin composition.

The MFR (190° C. under a load of 2160 g), measured in accordance with ASTM D1238, of the ethylene/(meth)acrylic acid copolymer (B) is generally in the range of 0.05 to 100 g/10 min, preferably 0.1 to 50 g/10 min.

In the ethylene/(meth)acrylic acid copolymer (B) for use in the present invention, none of the carboxyl groups forming side chains of the copolymer may be bonded with a metal, or at least some thereof may be present in the form of a metal salt of carboxylic acid (ionomer).

This metal salt is preferably, for example, an alkali metal salt such as a sodium salt, a lithium salt or a potassium salt; a divalent transition metal salt such as a zinc salt, a cobalt salt, a nickel salt, a manganese salt, a lead salt or a copper salt; or an alkaline earth metal salt such as a calcium salt or a magnesium salt. A zinc salt is especially preferred from the viewpoint that the transparency of the composition can be maintained. Only one type of metal salt or a plurality of metal salt types may be present in the copolymer.

When the ethylene/(meth)acrylic acid copolymer (B) is an ionomer, the ratio of carboxyl groups bonded with metal to all the carboxyl groups, although not particularly limited, is generally about 3 to 100%.

With respect to the process for producing the ethylene/(meth)acrylic acid copolymer (B), it, for example, comprises copolymerizing ethylene and (meth)acrylic acid, together with another comonomer according to necessity, by the high-pressure radical polymerization technique, optionally followed by neutralization with metal cations set forth above.

Polyethylene (C)

The polyethylene (C) for use in the present invention is, for example, an ethylene homopolymer or an ethylene/α-olefin copolymer prepared from ethylene and an α-olefin other than ethylene, which copolymer contains constituent units derived from the α-olefin in an amount of less than 15 mol %, preferably less than 5 mol %, and which copolymer has a crystallization degree, measured by the X-ray analysis, of at least 20%, preferably at least 30%, and still preferably at least 35%. The density of the polyethylene (C) is preferably in the range of 0.88 to 0.96 g/cm$^3$, still preferably 0.90 to 0.95 g/cm$^3$.

The α-olefin is, for example, propylene, 1-butene, 1-pentene, 1-hexene, 1-heptene, 1-octene, 1-decene, 1-dodecene, 1-hexadodecene, 4-methyl-1-pentene, 2-methyl-1-butene, 3-methyl-1-butene, 3,3-dimethyl-1-butene, diethyl-1-butene, trimethyl-1-butene, 3-methyl-1-pentene, ethyl-1-pentene, propyl-1-pentene, dimethyl-1-pentene, methylethyl-1-pentene, diethyl-1-hexene, trimethyl-1-pentene, 3-methyl-1-hexene, dimethyl-1-hexene, 3,5,5-trimethyl-1-hexene, methylethyl-1-heptene, trimethyl-1-heptene, dimethyloctene, ethyl-1-octene, methyl-1-nonene, vinylcyclopentene, vinylcyclohexene and vinylnorbornane.

The copolymer prepared from ethylene and the above olefin may be either a random copolymer or a block copolymer.

The process for producing the polyethylene (C) is not limited. For example, the polyethylene (C) maybe produced with the use of the conventional Ziegler catalyst such as a titanium catalyst, a chromium catalyst or a vanadium catalyst. Also, the polyethylene (C) may be produced with the use of a catalyst known as metallocene catalyst (for example, a zirconium compound plus aluminooxane).

The production of the polyethylene (C) for use in the present invention may be carried out in a vapor phase (vapor-phase process) or a liquid phase (liquid-phase process).

Polyester Resin Composition

The polyester resin composition of the present invention comprises the above polyethylene terephthalate (A) and ethylene/(meth)acrylic acid copolymer (B), wherein the ethylene/(meth)acrylic acid copolymer (B) is generally contained in the composition in an amount of 0.1 to 10,000 ppb, preferably 0.5 to 5000 ppb, and still preferably 0.8 to 2000 ppb, based on the composition.

Draw molding, especially highly transparent bottles, can be efficiently produced by regulating the amount of ethylene/(meth)acrylic acid copolymer (B) so as to fall within the above range. Blending of the ethylene/(meth)acrylic acid copolymer (B) in an amount falling within the above range causes the crystallization rate of the resultant molded item to become higher than that of the bottle produced with the use of polyethylene terephthalate alone, thereby enabling efficient production of bottles.

In addition to the above polyethylene terephthalate (A) and ethylene/(meth)acrylic acid copolymer (B), the polyester resin composition of the present invention may contain polyethylene (C). It is preferred that the ethylene/(meth)acrylic acid copolymer (B) and the polyethylene (C) be contained in the composition in a total amount of 0.1 to 10,000 ppb, especially 0.5 to 5000 ppb, and still especially 0.8 to 2000 ppb, based on the composition. The (meth)acrylic acid content based on the total weight of ethylene/(meth)acrylic acid copolymer (B) and polyethylene (C) preferably ranges from 0.5 to 8% by weight, still preferably 1 to 6% by weight.

Highly transparent heat-resistant draw molding, especially bottles, can be efficiently produced from the polyester resin composition containing polyethylene (C) as well.

Any of the conventional methods can be employed in the preparation of the polyester resin composition from the polyethylene terephthalate (A) and the ethylene/(meth)acrylic acid copolymer (B), optionally together with the polyethylene (C). For example, the polyester resin composition can be prepared by the method in which the polyethylene terephthalate (A) and the ethylene/(meth)acrylic acid copolymer (B), optionally together with the polyethylene (C), are directly mixed together by means of a mixer such as a tumbler blender or a Henschel mixer and kneaded in the molten state, or by the method in which the polyethylene terephthalate (A) and the ethylene/(meth)acrylic acid copolymer (B), optionally together with the polyethylene (C), are first kneaded together in the molten state to thereby obtain a master batch containing the ethylene/(meth)acrylic acid copolymer (B) in a high concentration and in which this master batch is appropriately compounded with the polyethylene terephthalate (A). Moreover, the polyester resin composition can be produced by the method in which the ethylene/(meth)acrylic acid copolymer (B), optionally together with the polyethylene (C), is added to the polyethylene terephthalate (A) during the liquid-phase polymerization, or by the method in which an molded item composed of the ethylene/(meth)acrylic acid copolymer (B), optionally together with the polyethylene (C), is installed during the step of producing the polyethylene terephthalate (A) so as to realize effective contact with the polyethylene terephthalate (A), thereby effecting adhesion and addition.

The polyester resin composition of the present invention may be loaded with other additives, for example, a colorant, an antioxidant, an ultraviolet absorber, an antistatic agent, a flame retarder and a lubricant, according to necessity.

The intrinsic viscosity (IV) of the polyethylene terephthalate (A) for use in the polyester resin composition of the present invention is preferably in the range of 0.65 to 0.85 dl/g. The molding formed from the polyester having the above intrinsic viscosity IV exhibits excellent gas barrier, pressure resistance and heat resistance.

It is preferred that the polyester resin composition of the present invention has high transparency when molded, and it is generally preferred that the haze value as measured with respect to a square plate formed from the polyester resin composition be in the range of 0.5 to 30%, especially 1 to 20%.

Further, from the viewpoint of enhancing the pressure resistance, it is preferred that the polyester resin composition of the present invention has high density when molded. It is generally preferred that the density of the molding fall in the range of 1.34 to 1.40 g/cm$^3$, especially 1.35 to 1.39 g/cm$^3$.

Still further, the polyester resin composition of the present invention has such an appropriate crystallization temperature that blow molded containers such as bottles can be efficiently produced. For example, the heat-up crystallization temperature (Tcc) is generally in the range of 132 to 152° C., preferably 135 to 150° C., and still preferably 137 to 148° C.

In the polyester resin composition composed of polyethylene terephthalate containing a small amount of ethylene/(meth)acrylic acid copolymer, it is presumed that, when the polyethylene terephthalate is heated up and crystallized during the blow molding, the ethylene/(meth)acrylic acid copolymer would act as a nucleus for crystallization, thereby increasing the crystallization rate.

It is usual that, when a polyester is loaded with another material in order to, for example, impart an additional function thereto, the transparency of the molding of the loaded polyester is inferior to that of the molding of the original polyester to thereby increase the haze value of molding. For example, when the polyethylene terephthalate is loaded with common polypropylene or polyethylene, the transparency of the molding of the loaded polyethylene terephthalate is inferior to that of the molding of polyethylene terephthalate alone whilst the former molding maintains transparency still fit for use.

However, the polyester resin composition of the present invention, by virtue of the use of a specified amount of ethylene/(meth)acrylic acid copolymer, exerts the unexpected effect that not only is the crystallization temperature of polyethylene terephthalate controlled so as to fall within the range suitable for molding but also the transparency of the molding thereof can be maintained so as to be identical with that of the molding of polyester alone.

The reason would be that the ethylene/(meth)acrylic acid copolymer could not exhibit any nucleating agent effect for polyethylene terephthalate when quenched from the molten state to solidify into the amorphous state because the ethylene/(meth)acrylic acid copolymer is highly compatible with polyethylene terephthalate.

<Blow molded container>

The blow molded container consisting of the polyester resin composition of the present invention can be produced by various customary methods.

For example, the blow molded container of the present invention can be obtained by the method in which first the polyester resin composition of the present invention is melted, secondly the thus melted and plasticized polyester is extruded through a die head into a parison (preform) by the use of a shaping machine such as a screw extruder, a plunger extruder or an accumulator, thirdly the parison is held by a recess-furnished divided metal mold for imparting the configuration of blow molded container and heated, and finally the heated parison is subjected to injection blow molding in which a fluid such as air is pressurized and injected into the heated parison to thereby expand the parison.

Also, the blow molded container of the present invention can be obtained by, after the above formation of the parison of the polyester resin composition of the present invention, effecting a stretch blow molding of the parison at an area stretch ratio (product of longitudinal stretch ratio multiplied by lateral stretch ratio) of 6 to 15.

This parison can be produced by conventional methods such as injection molding and extrusion. In the present invention, the mouth and neck portion of the parison may be heat-up crystallized prior to the stretch blow molding. Alternatively, the mouth and neck portion of the blow molded container obtained by the stretch blow molding may be heat-up crystallized.

The molding of the parison into the stretch blow molded container can be accomplished by heating the parison directly in the metal mold and introducing a blow fluid under pressure to thereby effect a stretch blowing at the above area stretch ratio into the blow molded container. Alternatively, the blow molded container with desired configuration may be produced by stretch blowing the parison into a temporary blow molded container, cooling it and effecting a heat-up stretch blow molding while charging the temporary blow molded container into the metal mold. Air, nitrogen, steam, water or the like can be used as the blow fluid. Of these, air is preferably employed.

In the present invention, the thus obtained blow molded container may be heat set. This heat setting can be performed by holding the obtained blow molded container in the metal mold generally heated at 100 to 200° C., preferably 110 to 170° C., generally for a period of at least 1 sec, preferably at least 3 sec. This heat setting enables increasing the density of the blow molded container, so that the blow molded container reinforced in strength, for example, pressure resistance can be obtained.

In the present invention, the blow molded container having undergone the injection blow molding or stretch blow molding and optionally heat setting is cooled before taken out from the metal mold. With respect to the cooling method, it is preferred to employ the "internal cooling method" in which, for example, cooled gas is blown into the internal part of the blow molded container so that cooling is effected from the inside of the blow molded container to the outside (outer surface) thereof. The cooling of the blow molded container from the inside (hollow part) enables taking out the blow molded container from the metal mold without the occurrence of deformation, shrinking, etc.

EFFECT OF THE INVENTION

The polyester resin composition of the present invention enables producing a molding having excellent transparency and heat resistance with high productivity.

The polyester resin composition enables producing a molding with especially high transparency, so that it can widely be used in blow molded containers, packaging films, etc. In particular, the blow molded container which is resistant to deformation at the charging of heat-sterilized hot potable can be produced from the polyester resin composition of the present invention.

BEST MODE FOR CARRYING OUT THE INVENTION

The present invention will be further illustrated below with reference to the following Examples, which in no way limit the scope of the invention.

<Measuring Method>
[Heat-up Crystallization Temperature (Tcc)]

Measuring was performed with the use of differential scanning calorimeter (DSC) manufactured by Perkin-Elmer Corp. 10 mg of a sample was weighed out onto a sample pan. The temperature of the sample was raised from room temperature to 290° C. at a rate of 320° C./min. The temperature was maintained at 290° C. for 10 min and lowered to 30° C., which was maintained for 10 min. Thereafter, the temperature of the sample was raised at a rate of 10° C./min, and the peak temperature of the exothermic peak generated thereby was defined as Tcc.

[Diethylene Glycol Content]

1 g of a sample was weighed out and heated in 3 ml of monoethanolamine at 280° C. to thereby effect a hydrolysis. The mixture was allowed to cool and neutralized with highly purified terephthalic acid. The resultant solution was filtered through filter paper No.5C. 1 μl of the obtained filtrate was injected in Gas Chromatograph HP5890 manufactured by Hewlett Packard, thereby determining the content of diethylene glycol.

[Content of Cyclic Trimer]

A given amount of polyethylene terephthalate was dissolved in o-chlorophenol, re-precipitated from tetrahydrofuran and filtered to thereby remove linear polyethylene terephthalate. Thereafter, the obtained filtrate was fed to liquid chromatograph (LC7A manufactured by Shimadzu Corp.) to thereby determine the amount of cyclic trimer contained in the polyethylene terephthalate. The quotient of this amount divided by the amount of polyethylene terephthalate subjected to measurement was defined as the content (% by weight) of cyclic trimer in polyethylene terephthalate.

[Intrinsic Viscosity (IV)]

A 0.5 g/dl sample solution was prepared with the use of a solvent of a mixture of phenol and 1,1,2,2-tetrachloroethane (50/50 on the weight basis), and the solution viscosity was measured at 25° C. The intrinsic viscosity (IV) was calculated from the solution viscosity.

[Transparency (Haze Value)]

A dry sample was molded into a stepped square plate by means of an injection molding machine whose cylinder temperature and metal mold temperature were set at 275° C. and 10° C., respectively. The transparency of a 5 mm thick portion of the stepped square plate was evaluated for comparison in terms of haze value (irregular reflectance of white light).

[Heat Resistance]

A blow molded container was allowed to stand still in an atmosphere of 40° C. and 90% humidity for one week. Thereafter, 90° C. water was charged in the blow molded container and held for 10 min. The inside volumes before the charging and after the charging and holding were measured. A shrinkage factor was calculated from the measured inside volumes before the charging and after the charging and holding by the formula:

Shrinkage factor (%)=100(X−Y)/X wherein X represents the inside volume (g) before the charging and Y represents the inside volume (g) after the charging and holding.

The heat resistance was evaluated from the thus determined shrinkage factor (%) on the following criteria:

○: 0≦shrinkage factor (%) <0.5, and x: 0.5≦shrinkage factor (%).

[Appearance of Blow Molded Container]

The haze at an approximate center of a side of a blow molded container was measured. The appearance of the blow molded container was evaluated from the haze value, as follows:

○: 0≦haze value (%) <5%, and x: 5≦haze value (%).

EXAMPLE 1

A polyester resin composition (intrinsic viscosity [IV]= 0.742 dl/g) composed of polyethylene terephthalate (A) whose intrinsic viscosity [IV], diethylene glycol content and cyclic trimer content were 0.760 dl/g, 1.33% by weight and 0.32% by weight, respectively, containing 550 ppb, based on the polyethylene terephthalate (A), of ethylene/methacrylic acid copolymer (B-I) whose methacrylic acid content and MFR were 4% by weight and 7 g/10 min, respectively, was prepared.

This polyester resin composition was melted and injection molded into a square plate, the transparency and heat-up crystallization temperature of which were measured.

Subsequently, the polyester resin composition was formed into a blow molded container, as follows.

A preform of 28 mm diameter was formed by means of injection molding machine M-100A (manufactured by Meiki Seisakusho) whose cylinder temperature and metal mold temperature were set at 280° C. and 10° C., respectively. The mouth portion of the obtained preform was heated at 170° C. for 5 min by the use of an oil bath to thereby crystallize it. Then, the column and bottom portions of the preform were heated and softened at 110° C.

Thereafter, this preform was subjected to a stretch blow molding which was carried out by the use of molding machine (model no.: LB01, manufactured by CORPOPLAST) under conditions such that the stretch temperature and the temperature of blow metal mold were 110° C. and 150° C., respectively. Thus, a 1.5 lit. blow molded container was obtained.

The heat resistance and appearance of this blow molded container were evaluated in the above manner.

The results are given in Table 1.

EXAMPLE 2

A polyester resin composition (intrinsic viscosity [IV]= 0.739 dl/g) was produced in the same manner as in Example 1, except that the amount of ethylene/methacrylic acid copolymer (B-I) was changed to 100 ppb.

In the same manner as in Example 1, this polyester resin composition was molded into a square plate, and the transparency and heat-up crystallization temperature of the square plate were measured.

Furthermore, a blow molded container was formed and the heat resistance and appearance thereof were evaluated in the same manner as in Example 1. The results are given in Table 1.

EXAMPLE 3

A polyester resin composition (intrinsic viscosity [IV]= 0.745 dl/g) was produced in the same manner as in Example 1, except that the amount of ethylene/methacrylic acid copolymer (B-I) was changed to 50 ppb.

In the same manner as in Example 1, this polyester resin composition was molded into a square plate, and the transparency and heat-up crystallization temperature of the square plate were measured.

Furthermore, a blow molded container was formed and the heat resistance and appearance thereof were evaluated in the same manner as in Example 1. The results are given in Table 1.

EXAMPLE 4

A polyester resin composition (intrinsic viscosity [IV]= 0.739 dl/g) was produced in the same manner as in Example 1, except that the ethylene/methacrylic acid copolymer (B-I) was replaced by ethylene/methacrylic acid copolymer (B-II) whose methacrylic acid content and MFR were 1% by weight and 8.5 g/10 min, respectively, this ethylene/methacrylic acid copolymer (B-II) contained in an amount of 310 ppb based on polyethylene terephthalate (A).

In the same manner as in Example 1, this polyester resin composition was molded into a square plate, and the transparency and heat-up crystallization temperature of the square plate were measured.

Furthermore, a blow molded container was formed and the heat resistance and appearance thereof were evaluated in the same manner as in Example 1. The results are given in Table 1.

EXAMPLE 5

A polyester resin composition (intrinsic viscosity [IV]= 0.741 dl/g) was produced in the same manner as in Example 4, except that the amount of ethylene/methacrylic acid copolymer (B-II) was changed to 100 ppb.

In the same manner as in Example 1, this polyester resin composition was molded into a square plate, and the transparency and heat-up crystallization temperature of the square plate were measured.

Furthermore, a blow molded container was formed and the heat resistance and appearance thereof were evaluated in the same manner as in Example 1. The results are given in Table 1.

EXAMPLE 6

A polyester resin composition (intrinsic viscosity [IV]= 0.740 dl/g) was produced in the same manner as in Example 4, except that the amount of ethylene/methacrylic acid copolymer (B-II) was changed to 50 ppb.

In the samemanner as in Example 1, this polyester resin composition was molded into a square plate, and the transparency and heat-up crystallization temperature of the square plate were measured.

Furthermore, a blow molded container was formed and the heat resistance and appearance thereof were evaluated in the same manner as in Example 1. The results are given in Table 1.

EXAMPLE 7

A polyester resin composition (intrinsic viscosity [IV]= 0.738 dl/g) was produced in the same manner as in Example 1, except that the ethylene/methacrylic acid copolymer (B-I) was replaced by ethylene/methacrylic acid copolymer (B-III) whose methacrylic acid content and MFR were 1% by weight and 4.5 g/10 min, respectively, and whose methacrylic acid residues were neutralized by metallic ions of zinc, this ethylene/methacrylic acid copolymer (B-III) contained in an amount of 10 ppb based on polyethylene terephthalate (A).

In the same manner as in Example 1, this polyester resin composition was molded into a square plate, and the transparency and heat-up crystallization temperature of the square plate were measured.

Furthermore, a blow molded container was formed and the heat resistance and appearance thereof were evaluated in the same manner as in Example 1. The results are given in Table 1.

EXAMPLE 8

A polyester resin composition (intrinsic viscosity [IV]= 0.742 dl/g) was produced in the same manner as in Example 7, except that the amount of ethylene/methacrylic acid copolymer (B-III) was changed to 5 ppb.

In the same manner as in Example 1, this polyester resin composition was molded into a square plate, and the transparency and heat-up crystallization temperature of the square plate were measured.

Furthermore, a blow molded container was formed and the heat resistance and appearance thereof were evaluated in the same manner as in Example 1. The results are given in Table 1.

EXAMPLE 9

A polyester resin composition (intrinsic viscosity [IV]= 0.738 dl/g) was produced in the same manner as in Example 1, except that the amount of ethylene/methacrylic acid copolymer (B-I) was changed to 210 ppb and that 210 ppb, based on polyethylene terephthalate (A), of low-density polyethylene (C-1) whose MFR and density were 7.2 g/10 min and 0.910 g/cm$^3$, respectively, was added to the polyester resin composition.

In the same manner as in Example 1, this polyester resin composition was molded into a square plate, and the transparency and heat-up crystallization temperature of the square plate were measured.

Furthermore, a blow molded container was formed and the heat resistance and appearance thereof were evaluated in the same manner as in Example 1. The results are given in Table 1.

EXAMPLE 10

A polyester resin composition (intrinsic viscosity [IV]= 0.737 dl/g) was produced in the same manner as in Example 1, except that the ethylene/methacrylic acid copolymer (B-I) was replaced by ethylene/methacrylic acid copolymer (B-IV) whose methacrylic acid content and MFR were 10% by weight and 8.7 g/10 min, respectively, this ethylene/methacrylic acid copolymer (B-IV) contained in an amount of 50 ppb based on polyethylene terephthalate (A). and that 450 ppb of low-density polyethylene (C-1) whose MFR and density were 7.2 g/10 min and 0.910 g/cm$^3$, respectively, was added to the polyester resin composition.

In the same manner as in Example 1, this polyester resin composition was molded into a square plate, and the transparency and heat-up crystallization temperature of the square plate were measured.

Furthermore, a blow molded container was formed and the heat resistance and appearance thereof were evaluated in the same manner as in Example 1. The results are given in Table 1.

Comparative Example 1

A polyester resin composition (intrinsic viscosity [IV]= 0.741 dl/g) was produced in the same manner as in Example 1, except that the amount of ethylene/methacrylic acid copolymer (B-I) was changed to 20,000 ppb.

In the same manner as in Example 1, this polyester resin composition was molded into a square plate, and the transparency and heat-up crystallization temperature of the square plate were measured.

Furthermore, a blow molded container was formed and the heat resistance and appearance thereof were evaluated in the same manner as in Example 1. The results are given in Table 1.

Comparative Example 2

A polyester resin composition (intrinsic viscosity [IV]= 0.739 dl/g) was produced in the same manner as in Example 1, except that the ethylene/methacrylic acid copolymer (B-I) was replaced by polyethylene (b).

The polyethylene (b) was low-density polyethylene whose MFR and density were 7.2 g/10 min and 0.910 g/cm$^3$, respectively.

In the samemanner as in Example 1, this polyester resin composition was molded into a square plate, and the transparency and heat-up crystallization temperature of the square plate were measured.

Furthermore, a blow molded container was formed and the heat resistance and appearance thereof were evaluated in the same manner as in Example 1. The results are given in Table 1.

Comparative Example 3

A square plate was formed in the same manner as in Example 1, except that the polyester resin composition was one (intrinsic viscosity [IV]=0.740 dl/g) not containing ethylene/methacrylic acid copolymer (B-I) and consisting only of polyethylene terephthalate (A). The transparency and heat-up crystallization temperature of the square plate were measured. Furthermore, a blow molded container was formed and the heat resistance and appearance thereof were evaluated in the same manner as in Example 1. The results are given in Table 1.

TABLE 1

|  | Resin (B) | | | Resin (C) | | | (Meth)acrylic acid content | | | | |
| --- | --- | --- | --- | --- | --- | --- | --- | --- | --- | --- | --- |
|  | type | (meth)acrylic acid content (wt. %) | (B) content in compsn. (ppb) | type | (meth)acrylic acid content (wt. %) | (C) content in compsn. (ppb) | based on total of resins (B) and (C) (wt. %) | Haze (%) | Tcc (° C.) | Heat resistance | Appearance of molded container |
| Example 1 | B-I | 4 | 550 | none | — | 0 | 4 | 11.0 | 139 | o | o |
| Example 2 | B-I | 4 | 100 | none | — | 0 | 4 | 9.2 | 142 | o | o |
| Example 3 | B-I | 4 | 50 | none | — | 0 | 4 | 8.5 | 143 | o | o |
| Example 4 | B-II | 1 | 310 | none | — | 0 | 1 | 12.1 | 137 | o | o |
| Example 5 | B-II | 1 | 100 | none | — | 0 | 1 | 7.6 | 139 | o | o |
| Example 6 | B-II | 1 | 50 | none | — | 0 | 1 | 8.2 | 141 | o | o |
| Example 7 | B-III | 1 | 10 | none | — | 0 | 1 | 6.4 | 142 | o | o |
| Example 8 | B-III | 1 | 5 | none | — | 0 | 1 | 7.3 | 145 | o | o |
| Example 9 | B-I | 4 | 210 | C-I | 0 | 210 | 2 | 7.6 | 137 | o | o |
| Example 10 | B-IV | 10 | 50 | C-I | 0 | 450 | 1 | 8.1 | 138 | o | o |
| Comp. Ex. 1 | B-I | 4 | 20000 | none | — | 0 | 4 | 24.5 | 131 | x | x |
| Comp. Ex. 2 | b | 0 | 550 | none | — | 0 | 0 | 18.3 | 134 | o | x |
| Comp. Ex. 3 | none | — | 0 | none | — | 0 | — | 9.4 | 153 | o | o |

B-I: ethylene/methacrylic acid copolymer (methacrylic acid content: 4 wt. %)
B-II: ethylene/methacrylic acid copolymer (methacrylic acid content: 1 wt. %)
B-III: ethylene/methacrylic acid copolymer (methacrylic acid content: 1 wt. %, Za salt)
b: polyethylene
B-IV: ethylene/methacrylic acid copolymer (methacrylic acid content: 10 wt. %)
C-1: polyethylene (same as polyethylene b)

What is claimed is:

1. A polyester resin composition comprising:
   (A) a polyethylene terephthalate composed mainly of repeating units derived from a dicarboxylic acid containing terephthalic acid and/or an esterified derivative thereof and a diol containing ethylene glycol and/or an esterified derivative thereof, said polyethylene terephthalate containing diethylene glycol units in a ratio of 0.5 to 2.0% by weight based on the polyethylene terephthalate, and
   (B) an ethylene/(meth)acrylic acid copolymer, said ethylene/(meth)acrylic acid copolymer (B) contained in the composition in an amount of 0.1 to 10,000 ppb based on the composition.

2. The polyester resin composition as claimed in claim 1, wherein the content of a cyclic trimer in the polyethylene terephthalate is not greater than 0.5% by weight based on the polyethylene terephthalate.

3. The polyester resin composition as claimed in claim 1, wherein the ethylene/(meth)acrylic acid copolymer (B) has a (meth)acrylic acid content of 0.5 to 8% by weight.

4. The polyester resin composition as claimed in claim 1, which comprises:
   (A) the polyethylene terephthalate
   (B) the ethylene/(meth)acrylic acid copolymer, and
   (C) polyethylene,
   the ethylene/(meth)acrylic acid copolymer (B) and the polyethylene (C) contained in the composition in a total amount of 0.1 to 10,000 ppb based on the composition, the (meth)acrylic acid content based on the total weight of ethylene/(meth)acrylic acid copolymer (B) and polyethylene (C) ranging from 0.5 to 8% by weight.

5. The polyester resin composition as claimed in any of claims 1 to 3, which exhibits a heat-up crystallization temperature, as measured by a differential scanning calorimeter, of 132 to 152° C.

6. A preform formed from the polyester resin composition of claim 5.

7. A blow molded container produced by stretch blowing the preform of claim 6.

8. The polyester resin composition as claimed in any of claims 1 to 4, wherein the polyethylene terephthalate (A) has an intrinsic viscosity IV of 0.65 to 0.85 dl/g.

9. A preform formed from the polyester resin composition as claimed in any of claim 5.

10. A blow molded container produced by stretch blowing the preform of claim 9.

* * * * *

UNITED STATES PATENT AND TRADEMARK OFFICE
CERTIFICATE OF CORRECTION

PATENT NO.     : 6,355,319 B1  Page 1 of 1
DATED          : March 12, 2002
INVENTOR(S)    : Koji Nakamachi et al.

It is certified that error appears in the above-identified patent and that said Letters Patent is hereby corrected as shown below:

<u>Column 14,</u>
Line 61, delete "claim 5", insert -- claims 1 to 4 --

Signed and Sealed this

Fifteenth Day of October, 2002

*Attest:*

*Attesting Officer*

JAMES E. ROGAN
*Director of the United States Patent and Trademark Office*